US008605624B2

(12) United States Patent
Desai et al.

(10) Patent No.: US 8,605,624 B2
(45) Date of Patent: *Dec. 10, 2013

(54) METHODS AND DEVICES FOR EXCHANGING PEER PARAMETERS BETWEEN NETWORK DEVICES

(75) Inventors: Tushar Desai, Foster City, CA (US);
Shashank Gupta, Santa Clara, CA (US);
Praveen Jain, San Jose, CA (US);
Kalyan K. Ghosh, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 483 days.

This patent is subject to a terminal disclaimer.

(21) Appl. No.: 12/202,004

(22) Filed: Aug. 29, 2008

(65) Prior Publication Data

US 2008/0316942 A1    Dec. 25, 2008

Related U.S. Application Data

(63) Continuation of application No. 10/430,491, filed on May 5, 2003, now Pat. No. 7,433,326.

(60) Provisional application No. 60/429,897, filed on Nov. 27, 2002.

(51) Int. Cl.
  *H04L 12/28* (2006.01)

(52) U.S. Cl.
  USPC .......................................... 370/255; 370/419

(58) Field of Classification Search
  None
  See application file for complete search history.

(56) References Cited

U.S. PATENT DOCUMENTS

| | | |
|---|---|---|
| 5,428,471 A | 6/1995 | McDermott |
| 5,506,838 A | 4/1996 | Flanagan |
| 5,617,421 A | 4/1997 | Chin et al. |
| 5,619,497 A | 4/1997 | Gallagher et al. |
| 5,675,741 A | 10/1997 | Aggarwal et al. |
| 5,682,479 A | 10/1997 | Newhall et al. |
| 5,708,659 A | 1/1998 | Rostoker et al. |
| 5,740,159 A | 4/1998 | Ahmad et al. |
| 5,740,171 A | 4/1998 | Mazzola et al. |
| 5,742,604 A | 4/1998 | Edsall et al. |
| 5,764,636 A | 6/1998 | Edsall |

(Continued)

FOREIGN PATENT DOCUMENTS

| | | |
|---|---|---|
| EP | 0772121 A | 5/1997 |
| EP | 0858036 | 8/1998 |

(Continued)

OTHER PUBLICATIONS

Office Action dated May 22, 2006 for related U.S. Appl. No. 10/170,855.

(Continued)

*Primary Examiner* — Ian N Moore
*Assistant Examiner* — Christine Duong
(74) *Attorney, Agent, or Firm* — Novak Druce Connolly Bove + Quigg LLP

(57) ABSTRACT

Methods and devices are provided for detecting whether peer ports interconnecting two network devices can perform a novel protocol called Exchange Peer Parameters ("EPP"). If the peer ports are so configured to perform EPP, EPP services are exchanged between the peer ports. In a first phase, information is exchanged about peer port configurations of interest. In a second phase, the results of the exchange of information are applied to hardware and/or software of the respective ports, as needed.

24 Claims, 13 Drawing Sheets

(56) References Cited

U.S. PATENT DOCUMENTS

| | | | |
|---|---|---|---|
| 5,793,976 A | 8/1998 | Chen et al. | |
| 5,805,924 A | 9/1998 | Stoevhase | |
| 5,809,285 A | 9/1998 | Hilland | |
| 5,818,603 A | 10/1998 | Motoyama | |
| 5,819,112 A | 10/1998 | Kusters | |
| 5,862,125 A | 1/1999 | Russ | |
| 5,959,972 A | 9/1999 | Hamami | |
| 5,959,990 A | 9/1999 | Frantz et al. | |
| 5,964,841 A | 10/1999 | Rekhter | |
| 5,999,930 A | 12/1999 | Wolff | |
| 6,035,105 A | 3/2000 | McCloghrie et al. | |
| 6,046,985 A | 4/2000 | Aldred | |
| 6,101,497 A | 8/2000 | Ofek | |
| 6,160,813 A | 12/2000 | Banks et al. | |
| 6,188,668 B1 | 2/2001 | Brewer et al. | |
| 6,188,694 B1 | 2/2001 | Fine et al. | |
| 6,202,135 B1 | 3/2001 | Kedem et al. | |
| 6,205,488 B1 | 3/2001 | Casey et al. | |
| 6,208,623 B1 * | 3/2001 | Rochberger et al. | 370/254 |
| 6,208,649 B1 | 3/2001 | Kloth | |
| 6,209,059 B1 | 3/2001 | Ofer et al. | |
| 6,219,699 B1 | 4/2001 | McCloghrie et al. | |
| 6,226,771 B1 | 5/2001 | Hilla et al. | |
| 6,243,358 B1 | 6/2001 | Monin | |
| 6,260,120 B1 | 7/2001 | Blumenau et al. | |
| 6,262,977 B1 | 7/2001 | Seaman et al. | |
| 6,266,705 B1 | 7/2001 | Ullum et al. | |
| 6,269,381 B1 | 7/2001 | St. Pierre et al. | |
| 6,269,431 B1 | 7/2001 | Dunham | |
| 6,295,296 B1 | 9/2001 | Tappan | |
| 6,295,575 B1 | 9/2001 | Blumenau et al. | |
| 6,310,884 B1 | 10/2001 | Odenwald, Jr. | |
| 6,330,614 B1 | 12/2001 | Aggarwal et al. | |
| 6,337,861 B1 | 1/2002 | Rosen | |
| 6,388,995 B1 | 5/2002 | Gai et al. | |
| 6,401,128 B1 | 6/2002 | Stai et al. | |
| 6,408,001 B1 | 6/2002 | Chuah et al. | |
| 6,426,952 B1 | 7/2002 | Francis et al. | |
| 6,438,612 B1 | 8/2002 | Ylonen et al. | |
| 6,473,421 B1 | 10/2002 | Tappan | |
| 6,493,349 B1 | 12/2002 | Casey | |
| 6,529,963 B1 | 3/2003 | Fredin et al. | |
| 6,532,212 B1 | 3/2003 | Soloway et al. | |
| 6,535,489 B1 | 3/2003 | Merchant et al. | |
| 6,597,663 B1 | 7/2003 | Rekhter | |
| 6,604,407 B2 | 8/2003 | Kano et al. | |
| 6,643,287 B1 | 11/2003 | Callon et al. | |
| 6,661,773 B1 | 12/2003 | Pelissier et al. | |
| 6,674,760 B1 | 1/2004 | Walrand et al. | |
| 6,728,220 B2 | 4/2004 | Behzadi | |
| 6,728,848 B2 | 4/2004 | Tamura et al. | |
| 6,766,482 B1 | 7/2004 | Yip et al. | |
| 6,775,230 B1 | 8/2004 | Watanabe et al. | |
| 6,804,776 B1 | 10/2004 | Lothberg et al. | |
| 6,848,007 B1 | 1/2005 | Reynolds et al. | |
| 6,859,435 B1 | 2/2005 | Lee et al. | |
| 6,879,560 B1 | 4/2005 | Cahn | |
| 6,904,053 B1 | 6/2005 | Berman | |
| 6,915,358 B2 | 7/2005 | Horton et al. | |
| 6,920,133 B1 | 7/2005 | Boodaghians | |
| 6,920,153 B2 | 7/2005 | Ellis et al. | |
| 6,920,154 B1 | 7/2005 | Achler | |
| 6,947,379 B1 | 9/2005 | Gleichauf et al. | |
| 6,959,151 B1 | 10/2005 | Cotter et al. | |
| 6,975,589 B2 | 12/2005 | Luft et al. | |
| 6,985,490 B2 | 1/2006 | Czeiger et al. | |
| 6,993,593 B2 | 1/2006 | Iwata | |
| 7,006,525 B1 | 2/2006 | Jha | |
| 7,026,288 B2 | 4/2006 | Judice et al. | |
| 7,027,406 B1 | 4/2006 | Shabtay et al. | |
| 7,046,679 B2 | 5/2006 | Sampath | |
| 7,050,392 B2 | 5/2006 | Valdevit | |
| 7,054,304 B2 | 5/2006 | Wang | |
| 7,061,858 B1 | 6/2006 | Di Benedetto et al. | |
| 7,072,298 B2 | 7/2006 | Paul et al. | |
| 7,076,594 B2 | 7/2006 | Benedetto et al. | |
| 7,079,544 B2 | 7/2006 | Wakayama et al. | |
| 7,082,140 B1 | 7/2006 | Hass | |
| 7,085,846 B2 | 8/2006 | Jenne et al. | |
| 7,155,494 B2 | 12/2006 | Czeiger et al. | |
| 7,161,935 B2 | 1/2007 | Alonso et al. | |
| 7,206,288 B2 | 4/2007 | Cometto et al. | |
| 7,216,158 B2 | 5/2007 | Revanuru et al. | |
| 7,221,652 B1 | 5/2007 | Singh et al. | |
| 7,275,103 B1 | 9/2007 | Thrasher et al. | |
| 7,301,898 B1 | 11/2007 | Martin et al. | |
| 7,302,494 B2 | 11/2007 | Hayashi et al. | |
| 7,319,669 B1 | 1/2008 | Kunz et al. | |
| 7,328,260 B1 | 2/2008 | Muthiyan et al. | |
| 7,330,892 B2 | 2/2008 | Ibrahim et al. | |
| 7,355,983 B2 | 4/2008 | Scudder et al. | |
| 7,366,194 B2 | 4/2008 | Yu et al. | |
| 7,376,755 B2 | 5/2008 | Pandya | |
| 7,406,034 B1 | 7/2008 | Cometto et al. | |
| 7,433,326 B2 | 10/2008 | Desai et al. | |
| 7,443,799 B2 | 10/2008 | Varanasi et al. | |
| 7,447,224 B2 | 11/2008 | Dropps et al. | |
| 7,499,410 B2 | 3/2009 | Dutt et al. | |
| 7,586,947 B2 | 9/2009 | Miki et al. | |
| 7,593,324 B2 | 9/2009 | Jain et al. | |
| 7,599,360 B2 | 10/2009 | Edsall et al. | |
| 7,616,637 B1 | 11/2009 | Lee et al. | |
| 7,649,844 B2 | 1/2010 | Bector et al. | |
| 7,916,628 B2 | 3/2011 | Ghosh et al. | |
| 7,990,975 B1 | 8/2011 | Dropps et al. | |
| 8,060,630 B1 | 11/2011 | Jancaitis et al. | |
| 8,072,988 B2 | 12/2011 | Dropps et al. | |
| 8,462,790 B2 | 6/2013 | Lee et al. | |
| 2001/0020254 A1 * | 9/2001 | Blumenau et al. | 709/229 |
| 2001/0049739 A1 | 12/2001 | Wakayama et al. | |
| 2002/0009081 A1 | 1/2002 | Sampath et al. | |
| 2002/0034178 A1 | 3/2002 | Schmidt et al. | |
| 2002/0075873 A1 | 6/2002 | Lindhorst-Ko et al. | |
| 2002/0085493 A1 | 7/2002 | Pekkala et al. | |
| 2002/0101868 A1 | 8/2002 | Clear et al. | |
| 2002/0110125 A1 | 8/2002 | Banks et al. | |
| 2002/0133740 A1 | 9/2002 | Oldfield et al. | |
| 2002/0150039 A1 | 10/2002 | Valdevit | |
| 2002/0152338 A1 | 10/2002 | Elliott et al. | |
| 2002/0156918 A1 | 10/2002 | Valdevit et al. | |
| 2002/0156924 A1 | 10/2002 | Czeiger et al. | |
| 2002/0176434 A1 | 11/2002 | Yu et al. | |
| 2002/0188754 A1 | 12/2002 | Foster et al. | |
| 2003/0012204 A1 | 1/2003 | Czeiger et al. | |
| 2003/0016624 A1 | 1/2003 | Bare | |
| 2003/0067925 A1 | 4/2003 | Choe et al. | |
| 2003/0084219 A1 * | 5/2003 | Yao et al. | 710/300 |
| 2003/0101239 A1 | 5/2003 | Ishizaki | |
| 2003/0107987 A1 | 6/2003 | Kinstler | |
| 2003/0118053 A1 | 6/2003 | Edsall et al. | |
| 2003/0142628 A1 | 7/2003 | Alonso et al. | |
| 2003/0145116 A1 | 7/2003 | Moroney et al. | |
| 2003/0149848 A1 | 8/2003 | Ibrahim et al. | |
| 2003/0163727 A1 * | 8/2003 | Hammons et al. | 713/201 |
| 2003/0189929 A1 * | 10/2003 | Matsuzaki et al. | 370/389 |
| 2003/0208618 A1 | 11/2003 | Mor et al. | |
| 2004/0028060 A1 | 2/2004 | Kang | |
| 2004/0085908 A1 | 5/2004 | Balasubramanian et al. | |
| 2004/0100910 A1 | 5/2004 | Desai et al. | |
| 2004/0151174 A1 | 8/2004 | Del Signore et al. | |
| 2004/0151188 A1 | 8/2004 | Maveli et al. | |
| 2004/0210656 A1 | 10/2004 | Beck et al. | |
| 2004/0230787 A1 | 11/2004 | Blumenau et al. | |
| 2004/0233921 A1 | 11/2004 | Krieg et al. | |
| 2005/0018606 A1 | 1/2005 | Dropps et al. | |
| 2005/0018663 A1 | 1/2005 | Dropps et al. | |
| 2005/0018701 A1 | 1/2005 | Dropps | |
| 2005/0025075 A1 * | 2/2005 | Dutt et al. | 370/299 |
| 2005/0036499 A1 | 2/2005 | Dutt et al. | |
| 2005/0080903 A1 | 4/2005 | Valenci | |
| 2005/0088969 A1 | 4/2005 | Carlsen et al. | |
| 2005/0108444 A1 | 5/2005 | Flauaus | |
| 2005/0117562 A1 | 6/2005 | Wrenn | |
| 2005/0177634 A1 | 8/2005 | Scudder et al. | |

(56) References Cited

U.S. PATENT DOCUMENTS

| | | | |
|---|---|---|---|
| 2005/0249123 | A1 | 11/2005 | Finn |
| 2005/0267965 | A1 | 12/2005 | Heller |
| 2006/0034302 | A1 | 2/2006 | Peterson |
| 2006/0038263 | A1 | 2/2006 | Eigner et al. |
| 2006/0087963 | A1 | 4/2006 | Jain et al. |
| 2006/0092932 | A1 | 5/2006 | Ghosh et al. |
| 2006/0117212 | A1 | 6/2006 | Meyer et al. |
| 2006/0153186 | A1 | 7/2006 | Bector |
| 2006/0159081 | A1 | 7/2006 | Dropps |
| 2007/0153816 | A1 | 7/2007 | Cometto et al. |
| 2008/0028096 | A1 | 1/2008 | Henderson et al. |
| 2009/0141657 | A1 | 6/2009 | Dutt et al. |
| 2010/0008375 | A1 | 1/2010 | Lee et al. |
| 2011/0090816 | A1 | 4/2011 | Dutt et al. |
| 2011/0141906 | A1 | 6/2011 | Ghosh et al. |

FOREIGN PATENT DOCUMENTS

| | | |
|---|---|---|
| EP | 1134938 | 9/2001 |
| EP | 1187406 | 3/2002 |
| JP | 2-209044 | 8/1990 |
| JP | 08111693 | 4/1996 |
| JP | 10-293633 | 11/1998 |
| JP | 2000-22699 | 2/2000 |
| JP | 2001-154929 | 6/2001 |
| JP | 2001-320420 | 11/2001 |
| JP | 2001-345865 | 12/2001 |
| KR | 2001-0083215 | 1/2001 |
| WO | 00/31925 | 6/2000 |
| WO | 01/19027 | 3/2001 |
| WO | WO01/69834 | 9/2001 |
| WO | 01/95565 | 12/2001 |
| WO | 02/071224 | 12/2002 |

OTHER PUBLICATIONS

Notice of Allowance dated Nov. 23, 2007 for U.S. Appl. No. 10/430,491.
Notice of Allowance dated Apr. 23, 2008 for U.S. Appl. No. 10/430,491.
Notice of Allowance dated Sep. 26, 2008 for U.S. Appl. No. 10/609,442.
Office Action dated Sep. 12, 2008 for U.S. Appl. No. 10/974,368.
Office Action dated Nov. 25, 2008 for U.S. Appl. No. 10/979,886.
Office Action mailed Dec. 12, 2008 for U.S. Appl. No. 11/027,252.
Office Action dated Dec. 22, 2008 for Japanese Application No. 2003-582973.
Office Action dated Sep. 5, 2008 for Chinese Patent Application No. 200380104466.6.
Office Action dated Nov. 19, 2008 for U.S. Appl. No. 10/034,160.
Office Action dated Dec. 26, 2008 for CN Patent Application No. 03807560.1.
Office Action dated Nov. 25, 2008 from U.S. Appl. No. 10/979,886.
Office Action dated Aug. 13, 2008 for Canadian Patent Application No. 2,480,462.
Office Action dated Jun. 22, 2007 for Chinese Patent Application No. 03813264.8.
Notice of Allowance dated Feb. 13, 2009 for U.S. Appl. No. 10/974,368.
U.S. Appl. No. 12/343,843, filed Dec. 24, 2008.
Office Action dated Jan. 30, 2008 for Canadian Patent Application No. 2,480,461.
Office Action dated Nov. 7, 2008 for Chinese Patent Application No. 200480010826.0.
Office Action dated Sep. 24, 2008 for Canadian Patent Application No. 2,521,463.
Office Action dated Sep. 26, 2008 for Australian Patent Application No. 20043000680.
Second Office Action issued on Apr. 24, 2009 for Chinese Patent Application No. 200380104466.6.
Notification of Provisional Rejection issued on Apr. 15, 2009 for KR Patent Application No. 2004-7010143.
Second Office Action issued on Apr. 28, 2009 for Canadian Patent Application No. 2,472,056.
US Office Action mailed Mar. 23, 2009 issued in U.S. Appl. No. 10/114,394.
"Fibre Channel Switch Fabric-3 (FC-SW-3)", NCITS working draft, Feb. 19, 2003. XP002300830 (A,B,C).
Guan et al., Inter-fabric FC Architecture, May 30, 2003, Brocade—The Intelligent Platform for Network Storage.
"Fibre Channel Switch Fabric-2 (FC-SW-2)", NCITS working draft, Jun. 26, 2001.
Fibre Channel Generic Services-3 (FC-GS-3), NCITS working draft, Nov. 28, 2000.
K. White, IBM Corp, RFC 2925, Sep. 2000.
Armitage, Grenville, "MPLS: The Magic Behind the Myths," Jan. 2000, IEEE Communications Magazine, pp. 124-131. XP000908346.
Listanti et al., "Architectural and Technological Issues for Future Optical Internet Networks", Optical Solutions for Next-Generation Internet Networks, IEEE Communication Magazine, Sep. 2000.
Cisco Systems, "Cisco SAN-OS Reference Guide", 1992-2004 Cisco Systems, Inc. pp. 1-13.
Cisco Systems, "Cisco SAN-OS", 1992-2003 Cisco Systems, Inc. pp. 1-7.
Cisco Systems, "Cisco MDS 9000 Family of Multilayer Directors and Fabric Switches", 1992-2003 Cisco Systems, Inc., pp. 1-4.
Ezio Valdevit, http://t11.org/index.htm, "Fabric Shortest Path First Version (FSPF) Rv. 0.2", Fabric shortest Path, May 23, 2000 XP002959525.
http://t11.org/index.htm, Fabric Shortest Path First (FSPF) Project 1508-D Switch Fabric—3 Rev. 6,5, Oct. 31, 2003, pp. 117-140.
DeSanti et al., "Tagged Frame Specification," Tagged Frame Spec., T11/03-353v0, May 2003, 4 pages.
Claudio DeSanti, "Virtual Fabrics", T11/03-220v0, PowerPoint presentation, Apr. 2003, 11 pages.
Claudio DeSanti, "Virtual Fabrics N_Port Support", VF N_Support, T11/04-49v0, Jul. 2004, 13 pages.
Claudio DeSanti, "Extended_Headers", VF N_Port Model, T11/04-627v1, Oct. 2004, 1 page.
Claudio DeSanti, "Virtual Fabrics Switch Support", VF Switch Support, T11/04-395v3, Oct. 2004, 15 pages.
Claudio DeSanti, "Virtual Fabrics N_Port Support", VF N_Support, T11/04-494v2, Oct. 2004, 14 pages.
Brocade Communication Systems, Inc. "Increasing Intelligence with the SAN Fabric", White paper, Online!, Jun. 2001 XP002251362.
Brocade Communication Systems, Inc. "Optimizing the performance and management of 2Gbit/sec SAN fabrics with ISL trunking", White paper, Online!, Mar. 2002.
Rosen et al., "Multiprotocol Label Switching Architecture", Network working group, RFC 3031, Jan. 2001 XP002251364.
Molero et al., "On the effect of link failure in fibre channel sotrage area networks", Parallel Architectures, Algorithms and Networks 2000, I-Span 2000 Proceedings, Int'l Symposium, Dec. 7-9, 2000.
VenKat Rangan: "Re: FCIP/1FCP: Gurantee In-Order delivery for FC N/NL_ports", IP Storage—Mailing List Archive, Online! http://www.pdl.cmu/edu/mailinglists/ips/mail/msg03069.html Sep. 4, 2001.
D. Mills, Network Working Group Request for Comments 1059, Network Time Protocol (Version 1) Specifiction and Implementation, University of Delaware, Jul. 1988, pp. 1-50.
M. Rajagopal, R. et al., "IP and ARP Over Fibre Channel" Request for Comments: 2625, 'Online!, Jun. 30, 1999, XP002246207.
Charles Monia: "iFCP—A Protocol for Internet Fibre Channel Storage Networking" Nishan Systems, 'Online!, Dec. 12, 2000, XP002246205.
Mearian et al., "What's After Fibre Channel?", Computerworld, Online!, Oct. 15, 2001, XP002246206.
Monia et al., "iFCP—A Protocol for Internet Fibre Channel Storage Networking" Feb. 2002.
ATM Forum Committee, Chapter 10, "Flush Message Protocol Procedures and Frame Formats," *Lan Emulation Over ATM Version 2—LUNI Specification*, AF-Lane-0084.000, Jul. 1997, pp. 111-115.

(56) References Cited

OTHER PUBLICATIONS

White Paper, Link Aggregation According to IEEE Standard 802.3ad, Oct. 10, 2002, v.1.10, pp. 1-21.
Kiiskilä, Marko, "Implementation of LAN Emulation of ATM in Linux," *Tampereen Teknillinen Korkeakoulu*, Oct. 1996, 57 pages.
IEEE Std 802.3-2002, Chapter 43.5 Marker Protocol, *Part 3: Carrier Sense Multiple Access with Collision Detection (CSMA/CD) Access Method and Physical Layer Specifications*, 2002, pp. 329-345.
D1: Yasumori Takizawa, "Technology Scope IP Storage Disk Divided by IP Network Wide Area Ethernet Encouraging the Same," *Nikkei Communications* Mar. 4, 200, No. 361, pp. 106-113.
D2: Glenn Sullivan, "Building of Long Distance SAN", *UNIX Magazine*, Apr. 1, 2000, vol. 15, No. 4, pp. 133-137.
D4: Fujita et al., "SSE98-225 QoS Control Using MPLS over ATIM," *Technical Report of IEICE*, Mar. 19, 1999, vol. 98, No. 668, pp. 81-86.
Non-Final Office Action dated Aug. 22, 2005 from U.S. Appl. No. 10/034,160.
Final Office Action dated Dec. 13, 2005 from U.S. Appl. No. 10/034,160.
Non-Final Office Action dated May 31, 2006 from U.S. Appl. No. 10/034,160.
Non-Final Office Action dated Sep. 26, 2006 from U.S. Appl. No. 10/034,160.
Final Office Action dated Feb. 5, 2007 from U.S. Appl. No. 10/034,160.
Non-Final Office Action dated Jul. 30, 2007 from U.S. Appl. No. 10/034,160.
Final Office Action dated Jan. 29, 2008 from U.S. Appl. No. 10/034,160.
Office Action dated May 22, 2006 from U.S. Appl. No. 10/114,568.
Office Action dated Oct. 23, 2006 from U.S. Appl. No. 10/114,568.
Office Action dated Apr. 6, 2007 from U.S. Appl. No. 10/114,568.
Final Office Action dated Sep. 20, 2007 from U.S. Appl. No. 10/409,427.
Notice of Allowance dated Mar. 26, 2008 from U.S. Appl. No: 10/114,568.
Final Office Action dated Sep. 20, 2007 from U.S. Appl. No. 10/114,568.
Allowed claims from U.S. Appl. No: 10/114,568.
Office Action dated Oct. 17, 2006 from U.S. Appl. No. 10/114,394.
Final Office Action dated Apr. 4, 2007 from U.S. Appl. No. 10/114,394.
Office Action dated Aug. 22, 2007 from related U.S. Appl. No. 10/114,394.
Office Action dated Feb. 6, 2008 for U.S. Appl. No. 10/114,394.
Notice of Allowance dated Dec. 6, 2006 for U.S. Appl. No. 10/170,855.
Allowed Claims for U.S. Appl. No. 10/170,855.
Office Action dated Feb. 23, 2007 from U.S. Appl. No. 10/430,491.
Final Office Action dated Aug. 9, 2007 from U.S. Appl. No. 10/430,491.
Notice of Allowance for U.S. Appl. No. 10/430,491.
Notice of Allowance dated Nov. 23, 2007 for U.S. Appl. No. 10/430,491 dated Apr. 23, 2008.
Notice of Allowance dated Aug. 8, 2008 from U.S. Appl. No. 10/430,491.
Supplemental Notice of Allowance dated Aug. 26, 2008 from U.S. Appl. No. 10/430,491.
Allowed claims for U.S. Appl. No. 10/430,491.
Office Action dated Mar. 28, 2007 from U.S. Appl. No. 10/609,442.
Final Office Action dated Sep. 5, 2007 from U.S. Appl. No. 10/609,442.
Office Action dated Mar. 28, 2008 from U.S. Appl. No. 10/609,442.
Office Action dated Mar. 28, 2007 from U.S. Appl. No. 10/791,143.
Office Action dated Sep. 10, 2007 from U.S. Appl. No. 10/974,368.
Notice of Allowance dated May 1, 2008 from U.S. Appl. No. 10/974,368.
Office Action dated May 13, 2008 from U.S. Appl. No. 10/979,886.
Office Action mailed Oct. 29, 2007 from U.S. Appl. No. 11/027,252.
International Search Report dated May 23, 2003 from PCT Application No. PCT/US02/41072, 5 pages.
International Search Report dated Oct. 17, 2003 from PCT Application No. PCT/US03/09328.
International Search Report dated Jul. 15, 2003 from PCT Application No. PCT/US03/09442.
International Search Report dated Nov. 4, 2003 from PCT Application No. PCT/US03/18765.
International Search Report dated Jul. 12, 2004 from PCT Application No. PCT/US03/36452.
International Search Report dated Oct. 27, 2004 from PCT Application No. PCT/US2004/020518.
International Search Report dated Oct. 25, 2006 from PCT Application No. PCT/US05/37763.
Written Opinion dated Oct. 25, 2006 from PCT Application No. PCT/US05/37763.
International Preliminary Report on Patentability dated Dec. 29, 2004 from PCT/US05/044726.
Office Action dated Jan. 18, 2005 from EP Patent Application No. 02799279.1-1525.
Office Action dated Oct. 18, 2005 from EP Patent Application No. 02799279.1-1525
Office Action dated Feb. 20, 2006 from EP Patent Application No. 02799279.1-1525.
Search Report dated Feb. 10, 2006 from EP Patent Application No. 03746053.2-2416.
Office Action dated Oct. 1, 2007 from EP Patent Application No. 03746053.2-2416.
Office Action dated Mar. 28, 2007 from EP Patent Application No. 03746053.2-2416.
Search Report dated May 19, 2005 from EP Patent Application No. 03 746062.3-1249.
Office Action dated Apr. 5, 2006 from EP Patent Application No. 03 739 127.3-2416.
Office Action dated Nov. 6, 2007 EP Patent Application No. 03789766.7.
Office Action dated Mar. 16, 2007 from AU Patent Application No. 2002364204.
Office Action dated May 30, 2007 from related AU Patent Application No. 2003226022.
Office Action dated May 23, 2007 from related AU Patent Application No. 2003226093.
Office Action dated Oct. 4, 2007 from AU Patent Application No. 2003245492.
Examination Report dated Jul. 14, 2008 from AU Patent Application No. 2003296301.
Office Action dated Jun. 15, 2006 from CA Patent Application No. 2,487,071.
Office Action dated Dec. 1, 2006 from related CN Patent Application No. 02828262.0
Office Action dated Mar. 7, 2008 from CN Application No. 03807560.1.
Office Action, Chinese Patent Application No. 03807600.4, Issued Sep. 8, 2006.
Office Action dated Jun. 22, 2007 from CN Patent Application No. 03813264.8.
Office Action dated Oct. 19, 2007 from CN Patent Application No. 200480010826.0.
Office Action dated May 19, 2008 from JP Patent Application No. 2003-559086.
Office Action dated Jun. 2, 2008 from JP Patent Application No. 2003-582973.
Office Action dated May 12, 2008 from JP Patent Application No. 2003-582964.
Lee et al., "Label Switching in Fibre Channel Networks" U.S. Appl. No. 10/114,394, filed Apr. 1, 2002.
Final Office Action dated Aug. 21, 2008 for U.S. Appl. No. 10/114,394.
Final Office Action dated Aug. 7, 2008 for U.S. Appl. No. 11/027,252.
Office Action dated Jun., 6, 2008 for CN Patent Application No. 200580034140.X.

(56) References Cited

OTHER PUBLICATIONS

Office Action dated Aug. 13, 2008 for CA Patent Application No. 2,472,056.
M. Rajagopal, R. et al., "Fibre Channel Over TCP/IP" DRAFT-IETF-IPS-FCOVERTCPIP-06.TXT, Mar. 1,2002, pp. 1-46, XP015021184.
Monia, et al., "iFCP—A Protocol for Internet Fibre Channel Storage", DRAFT-MONIA-IPS-IFCP-01.TXT, Jan. 1, 2001, pp. 1-48, XP01502633.
International Preliminary Examination Report dated Aug. 7, 2003 issued to PCT/US02/41072.
PCT Written Opinion dated Oct. 27, 2004 from corresponding PCT/US2004/020518.
International Preliminary Report on Patentability dated Jan. 12, 2006 from corresponding PCT Application No. PCT/US2004/020518.
PCT International Preliminary Report on Patentability dated May 10, 2007 from related PCT/US05/037763.
CA Second Office Action dated May 11, 2009 for Canadian Application No. 2,480,462.
CA Third Office Action dated Feb. 8, 2010 for Canadian Application No. 2,480,462.
CA Second Office Action dated Jun. 17, 2009 for Canadian Application No. 2,521,463.
CA Third Office Action dated Apr. 30, 2010 for Canadian Application No. 2,521,463.
CN Second Office Action mailed May 8, 2009 for Application No. 03807600.4.
CN Third Office Action mailed Aug. 28, 2009 for Application No. 03807600.4.
CN Fourth Office Action mailed Feb. 5, 2010 for Application No. 03807600.4.
CN Second Office Action dated Oct. 16, 2009 for Application No. 03813264.8.
CN Third Office Action dated Nov. 20, 2009 for Application No. 200380104466.6.
EP Office Action dated May 30, 2006 for EP Application No. 02799279.1-1525.
EP Office Action dated Oct. 8, 2009 from related EP Application No. 03746053.2-2416.
EP Office Action dated Feb. 9, 2010 from related EP Application No. 03 746062.3-1249.
JP Office Action mailed Jul. 27, 2009 for Japanese Application No. 2003-582973.
JP Final Office Action mailed May 25, 2009 for Japanese Application No. 2003582964.
KR Notification of Provisional Rejection dated Sep. 18, 2009 issued for KR Patent Application No. 2004-7015587 as stated in the letter from Kim and Cho dated Sep. 29, 2009.
KR Notification of Provisional Rejection dated Oct. 22, 2009 for Application No. 2004-7015583 as stated in the letter from Kim and Cho dated Oct. 28, 2009.
U.S. Notice of Allowance dated May 29, 2009 from related U.S. Appl. No. 10/034,160.
U.S. Allowed Claims (May 29, 2009) from related U.S. Appl. No. 10/034,160.
U.S. Notice of Allowance dated Jun. 25, 2009 from related U.S. Appl. No. 10/114,394.
U.S. Allowed Claims (Jun. 25, 2009) from related U.S. Appl. No. 10/114,394.
U.S. Allowed claims (Sep. 26, 2008) from related U.S. Appl. No. 10/609,442.
U.S. Office Action dated Apr. 28, 2010, from related U.S. Appl. No. 12/343,843.
U.S. Notice of Allowance dated Apr. 21, 2009 from related U.S. Appl. No. 10/974,368.
U.S. Allowed Claims (Apr. 21, 2009) from related U.S. Appl. No. 10/974,368.
U.S. Office Action dated Jul. 10, 2009 from related U.S. Appl. No. 10/979,886.
U.S. Office Action dated Jan. 29, 2010 from related U.S. Appl. No. 10/979,886.
U.S. Notice of Allowance mailed Jun. 26, 2009 from related U.S. Appl. No. 11/027,252.
U.S. Allowed claims (Jun. 26, 2009) from related U.S. Appl. No. 11/027,252.
U.S. Notice of Allowance mailed Nov. 9, 2009 from related U.S. Appl. No. 11/027,252.
CN Office Action dated Dec. 21, 2010 for Application No. 201010141491.3.
CN Office Action dated Jun. 19, 2011 for Application No. 201010141491.3.
EP Office Action dated Dec. 16, 2010 from related EP Application No. 03 746062.3-1249.
EP Office Action mailed Mar. 10, 2011 for EP Application No. 05810274.0.
EP Search Report dated Sep. 9, 2011 from related EP Application No. 05853608.7.
JP Office Action mailed Apr. 4, 2011 for Japanese Application No. 2009-221174.
U.S. Non-Final Office Action dated Oct. 1, 2010, from related U.S. Appl. No. 12/566,013.
U.S. Final Office Action dated Apr. 1, 2011, U.S. Appl. No. 12/566,013.
U.S. Office Action dated Oct. 28, 2011, U.S. Appl. No. 12/566,013.
U.S. Notice of Allowance issued Jul. 7, 2010 from related U.S. Appl. No. 11/713,341.
Notice of Allowance dated Sep. 20, 2010, from related U.S. Appl. No. 12/343,843.
Notice of Allowance dated Jul. 26, 2010 from related U.S. Appl. No. 10/979,886.
Notice of Allowance dated Nov. 19, 2010 from related U.S. Appl. No. 10/979,886.
EP Office Action mailed Jan. 26, 2012 for EP Application No. 04756162.6.
U.S. Appl. No. 13/903,580, "Label switching in fibre channel networks," Lee et al., filed May 28, 2013.
U.S. Final Office Action dated Sep. 25, 2012, issued in U.S. Appl. No. 12/566,013.
U.S. Notice of Allowance dated Feb. 8, 2013, issued in U.S. Appl. No. 12/566,013.
U.S. Office Action dated Sep. 25, 2012, issued in U.S. Appl. No. 12/975,072.
U.S. Final Office Action dated Apr. 10, 2013, issued in U.S. Appl. No. 12/975,072.
U.S. Office Action dated Oct. 24, 2012 issued in U.S. Appl. No. 13/031,013.
U.S. Final Office Action dated Apr. 10, 2013 issued in U.S. Appl. No. 13/031,013.
EP Intention to Grant dated Jun. 22, 2012 issued in EP Application No. 05853608.7.

\* cited by examiner

OPERATIONAL TRUNK MODE

| LOCAL ADMIN TRUNK MODE | PEER ADMIN TRUNK MODE | | |
|---|---|---|---|
| | OFF | ON | AUTO |
| OFF | NT | NT | NT |
| ON | NT | T | T |
| AUTO | NT | T | NT |

NT=Non-trunking
T=trunking

*FIG. 6*

| Item | Value | Size (bytes) |
|---|---|---|
| Command Id | 0x71000000 | 4 |
| Revision | 1 (for first version) | 1 |
| EPP Command Code | 0x0001 (EPP_SYNC) <br><br> 0x0002 (EPP_COMMIT) | 1 |
| Session | 0x0001 thru 0xffff | 2 |
| Switch WWN | Global switch Name | 8 |
| Reserved | 0x0000 | 2 |
| Payload Length | length of EPP payload <br><br> (without FC header) | 2 |

FIG. 10

METHODS AND DEVICES FOR EXCHANGING PEER PARAMETERS BETWEEN NETWORK DEVICES

RELATED APPLICATIONS

This application claims priority to U.S. patent application Ser. No. 10/430,491, filed May 5, 2003 and to U.S. Provisional Patent Application No. 60/429,897, filed Nov. 27, 2002, both of which are hereby incorporated by reference for all purposes.

BACKGROUND OF THE INVENTION

1. Field of the Invention

The present invention generally relates to data networks. More specifically, the invention relates to the configuration of routers, switches and other network devices within such data networks.

2. Description of Related Art

Several limitations may be encountered when configuring networks such as local area networks, storage area networks and the like. There are a variety of network devices, such as routers, switches, bridges, etc., which may be used to configure such networks. Some of these network devices have greater capabilities than others. For example, some devices may readily be configured to support logical networks superimposed upon a physical network (e.g., virtual local area networks ("VLANs") or virtual storage area networks ("VSANs")) and some may not.

In order to allow multiple VLANs to share a single inter-switch link on the underlying physical topology, the inter-switch link protocol ("ISL") was developed at Cisco Systems. See for example U.S. Pat. No. 5,742,604, entitled "Inter-switch link mechanism for connecting high-performance network switches," Edsall, et al., issued on Apr. 21, 1998 to Cisco Systems, Inc., which is hereby incorporated by reference for all purposes. ISL provides an encapsulation mechanism for transporting packets between ports of different switches in a network on the basis of VLAN associations among those ports In one example, it would be useful to transport packets of different frame types using the same inter-switch link instead of dedicating inter-switch links for different frame types. For example, it would be desirable if links between network devices could carry both Ethernet and Fiber Channel ("FC") frames.

It is also important to determine as quickly as possible whether a network device has certain capabilities. For example, it would be very useful to determine quickly whether a peer port of another network device is configured (or could be configured) to carry frames of particular VLANs or VSANs, and to configure the network device as needed. Otherwise, various problems (including dropped frames) will ensue if the network device is connected to other devices that are transmitting frames for the wrong VLAN or VSAN. However, testing and configuring network devices for such capabilities can be time-consuming.

SUMMARY OF THE INVENTION

According to some aspects of the invention, a new protocol, known herein as Exchange Peer Parameters ("EPP"), is provided for communication between peer ports of network devices that form part of the fabric of a network. In some embodiments, EPP protocol is used to exchange information and/or to configure E or F ports of an FC network.

Methods and devices are provided for detecting whether an attached peer port of a network device can exchange peer parameters with the corresponding port according to a novel Exchange Peer Parameters ("EPP") protocol. If the peer port is so configured, EPP service exchanges are performed with the peer port. In a first phase, information is exchanged about peer port configurations of interest. In a second phase, the results of the exchange of information are applied to hardware and/or software of the peer ports, as needed.

According to some aspects of the invention, when an inter-switch link is formed, a port of a peer network device is interrogated to determine whether it can support EPP protocol. If so, EPP service exchanges are performed with the peer port.

According to other aspects of the invention, configuration information is exchanged between peer ports in a network after an inter-switch link has been formed between the peer ports and after data frames have been transmitted to and from the peer network device. Such an information exchange may occur, for example, when the trunk mode of one of the ports has been changed during operation of the port. The results of the exchange of information are applied to hardware and/or software of the peer ports, as needed.

According to some implementations of the invention, methods and devices are provided for configuring a port of a network device in trunking mode so that all frames are transmitted in a novel format known as extended inter-switch link ("EISL") format, which will be discussed in more detail below. According to some such aspects of the invention, when an inter-switch link is formed, a port of a peer network device is interrogated to determine whether it can be a trunking port. If so, the port is configured to be in trunking mode using the EPP protocol.

According to some preferred aspects of the invention, the EPP protocol is used after the Exchange Switch Capabilities ("ESC") protocol. ESC may be used to exchange a set of protocols supported by the switch. EPP is one such protocol in the set of protocols. The EPP protocol is used, for example, to determine whether a port of a network device is configurable for supporting VLANs, VSANs and/or EISL. The EPP protocol can be used, for example, to configure an E or F port for EISL. If an E port is so configured, the port is referred to as a "trunking E port" or a TE port.

According to some implementations of the invention, a method is provided for modifying configurations of peer ports interconnecting network devices. The method includes: determining that the interconnected peer ports, comprising a first port of a first network device and a second port of a second network device, can support Exchange Peer Parameters protocol; exchanging configuration information using the Exchange Peer Parameters protocol between the interconnected peer ports; and configuring the interconnected peer ports according to the exchanged information.

The determining step can involve exchanging information between the first port and the second port via, for example, Exchange Link Parameter protocol or Exchange Switch Capability protocol. The exchanging step can involve exchanging frames in, for example, type-length-value format or a fixed frame length format.

The configuration information can include, for example, virtual storage area network information or trunk mode information. The configuration information can be exchanged when the interconnected peer ports are being initialized or when the interconnected peer ports have already been initialized. The configuration step can include configuring the hardware and/or the software of the interconnected peer ports according to the exchanged information.

Alternative implementations of the invention provide a method for modifying a configuration of a network device. The method includes: determining that a first expansion port of a first network device, the first expansion port attached to a second expansion port of a second network device, can be configured to transmit frames in Extended Interswitch Link format; and configuring the first expansion port to transmit frames in Extended Interswitch Link format.

The determining step can include exchanging trunk mode information between the first expansion port and the second expansion port via Exchange Peer Parameters protocol. The configuring step can include configuring the hardware and/or software of the first expansion port to enable transmission of frames in Extended Interswitch Link format. The configuring step can involve informing the second expansion port via Exchange Peer Parameters protocol that the configurations have been applied to the first expansion port.

Some embodiments of the invention provide a computer program for causing a first expansion port of a first network device to modify a configuration of a second expansion port of a second network device. The computer program causes the first expansion port to perform the following steps: determining that the second expansion port can be configured as a trunking port for transmitting frames in Extended Interswitch Link format; and configuring the second expansion port as a trunking port.

The determining step may involve exchanging information between the first expansion port and the second expansion port via Exchange Link Parameter protocol or via Exchange Switch Capability protocol. The configuring step can include exchanging information between the first expansion port and the second expansion port via Exchange Peer Protocol.

Alternative aspects of the invention provide a carrier wave embodying an encoded data signal for modifying a configuration of a network device. The encoded data signal includes: a command code field for identifying whether a command is from a synchronization phase or a commit phase of a process for configuring an expansion port of the network device; and a command identifier field for indicating whether a request to perform part of the process has been accepted or rejected.

The encoded data signal may also include trunk configuration information. The trunk configuration information can include, e.g., administratively configured trunk mode information for trunk mode negotiation, virtual storage area network list information, or port virtual storage area network information. The administratively configured trunk mode information can include a setting selected from the group consisting of ON, OFF and AUTO.

Yet other embodiments of the invention provide an apparatus for modifying a configuration of a network device. The apparatus includes: a mechanism for determining that the interconnected peer ports, comprising a first port of a first network device and a second port of a second network device, can support Exchange Peer Parameters protocol; a mechanism for exchanging configuration information using the Exchange Peer Parameters protocol between the interconnected peer ports; and a mechanism for configuring the interconnected peer ports according to the exchanged information. These mechanisms may or may not be separate devices, according to the implementation.

Still other embodiments of the invention provide a first network device for modifying a configuration of a second network device. The first network device is configured to perform the following steps: determining that a port of the second network device can support Exchange Peer Parameter protocol; and causing the port to be configured based on configuration information exchanged between the first network device and the port via Exchange Peer Parameters protocol.

The determining step can include exchanging information between the first network device and the port via Exchange Link Parameter protocol or Exchange Switch Capability protocol. The configuring step can include exchanging information between the first network device and the port via Exchange Peer Parameter protocol.

A further understanding of the nature and advantages of the present invention may be realized by reference to the remaining portions of the specification and the drawings.

BRIEF DESCRIPTION OF THE DRAWINGS

FIG. 6 is a table that indicates how differences are resolved between a local trunk mode and a peer trunk mode.
FIG. 10 is a table that describes one example of an EPP header.

DESCRIPTION OF THE PREFERRED EMBODIMENTS

Figure 1:
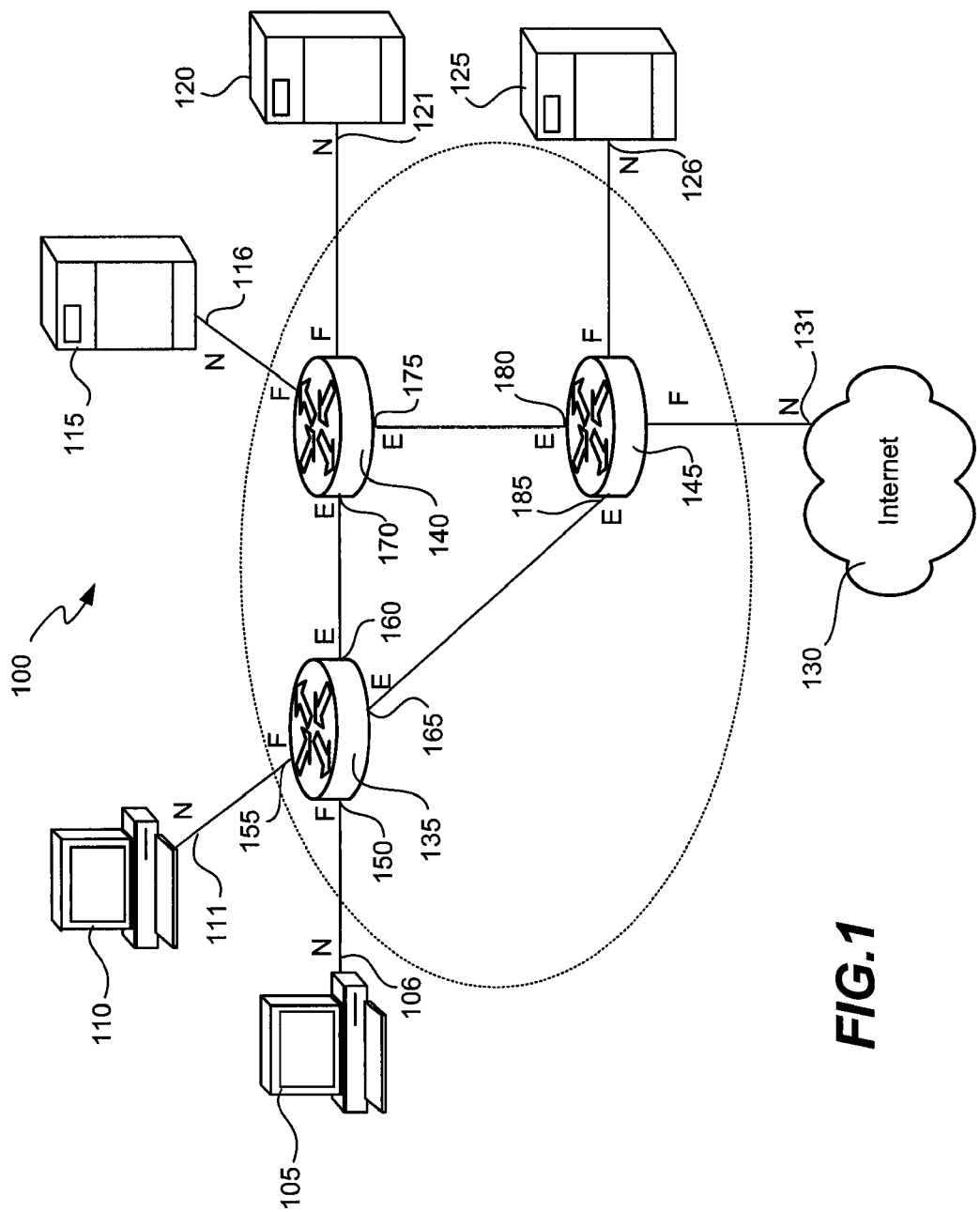
FIG. 1 illustrates a storage area network.

FIG. 1 indicates network 100, which is a storage area network ("SAN") according to some preferred aspects of the present invention. Although the following description will focus on SANs and their corresponding protocols, etc., the present invention is applicable to other networks, such as LANs.

SAN 100 includes nodes 105 and 110, which may be host devices such as personal computers. SAN 100 also includes nodes 115, 120 and 125, which are storage devices in this instance. Although Internet 130 is not part of SAN 100, it is connected to SAN 100 via node 131. Similarly, nodes 105 through 125 are connected to SAN 100 via ports 106, 111, 116, 121 and 126, respectively.

SAN 100 also includes network devices 135, 140 and 145. Such network devices may be of any kind known in the art, such as routers, switches, bridges, etc. These network devices are connected to their respective nodes by fabric ports. For example, network device 135 is connected to nodes 105 and 110 by fabric ports 150 and 155, respectively. Such ports are designated with an "F" in FIG. 1.

Connections between network devices are made by expansion ports or "E" ports. Connections between E ports are referred to as Inter-Switch Links ("ISLs"). For example, network device 135 is connected to network device 140 via an ISL between E port 160 of network device 135 and E port 170 of network device 140. Similarly, the connection between network device 140 and 145 is made by an ISL between E ports 175 and 180.

As is well known in the art, connections between network devices and nodes of storage area networks are commonly made via optical fiber. Data are transmitted on such networks according to various formats, but most commonly using the Fiber Channel protocol.

Some network devices may be configured to support a novel frame format, known as extended inter-switch link ("EISL") format, which is the subject of other pending patent applications assigned to Andiamo Systems. The description of some embodiments and applications of EISL in U.S. patent application Ser. No. 10/034,160 is hereby incorporated by reference for all purposes. In one example, the EISL format allows a single network device to process frames or packets having different formats. For example, a network device configured to support EISL may process both FC frames and Ethernet frames. The EISL format also supports VLANs, VSANs and similar features.

An EISL format allows the implementation of a fiber channel network with features and functionality beyond that provided by ISL format. In one example, the EISL format allows a port (known herein as a "trunking port") to transport frames of more than one format. For example, a trunking port can switch Ethernet and Fiber Channel ("FC") frames and is adaptable to transmitting frames of other formats as they are developed. An EISL header is used on EISL links to enable this transportation of different frame types. In another example, the EISL format allows the implementation of multiple virtual storage area networks (VSANS) on a single physical network. In still other examples, the EISL format provides mechanisms for implementing forwarding mechanisms such as Multi-Protocol Label Switching (MPLS) or Time To Live (TTL) fields specifying how packets should be forwarded and when packets or frames should be dropped. Any format allowing for the implementation of multiple virtual storage area networks on a physical fiber channel network while also allowing the transmission of different frame types, forwarding fields, and/or time to live, etc. is referred to herein as an EISL format.

Figure 2:
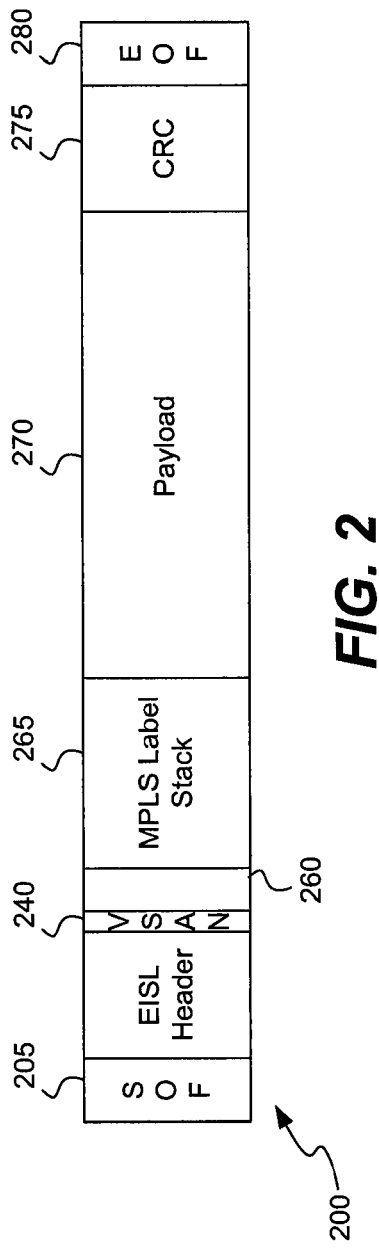
FIG. 2 depicts an EISL frame.

FIG. 2 indicates one example of an EISL frame. One of skill in the art will appreciate that the size, sequence and functionality of the fields within this EISL frame can vary from implementation to implementation. For example, the numbers of bits indicated for each field are different in alternative EISL frames.

The EISL frame 200 is bounded by start of frame delimiter ("SOF") 205 an end of frame delimiter ("EOF") 280. These delimiters enable an EISL-capable port to receive frames in a standard format at all times. If an EISL-capable port is not in EISL mode and receives frames in the EISL format, it accepts the frame according to some aspects of the invention. However, the port may not be able to send frames in EISL format.

In this embodiment, EISL header 260 includes VSAN field 240, which specifies the virtual storage area network number of payload 270. A VSAN allows for multiple logical or "virtual" storage area networks to be based upon a single physical storage area network. Accordingly, VSAN field 240 of EISL header 260 indicates the virtual storage area network to which this frame belongs.

MPLS label stack field 265 provides a common forwarding mechanism for both FC and Ethernet frames. Cyclic redundancy check ("CRC") field 275 is used for error detection.

Exchange Link Parameter ("ELP") protocol is an existing FC protocol that is used for communication with E ports. Similarly, Exchange Switch Capability ("ESC") protocol is an existing FC protocol that is used for communication between E ports. These protocols can be used to exchange information regarding the capabilities of network devices.

According to some aspects of the invention, a new protocol, known herein as exchange peer protocol ("EPP"), is provided for communication between E ports. According to some preferred aspects of the invention, the EPP protocol is used after the ESC protocol. In such implementations, ESC protocol is used to determine if a network device is capable of performing EPP protocol exchange. The EPP protocol may be used, for example, to determine the port VSAN of a peer port of a network device or to determine whether the peer port is configurable for supporting EISL. When the peer port is enabled for EISL, the peer port is referred to as a "trunking port".

Figure 3:
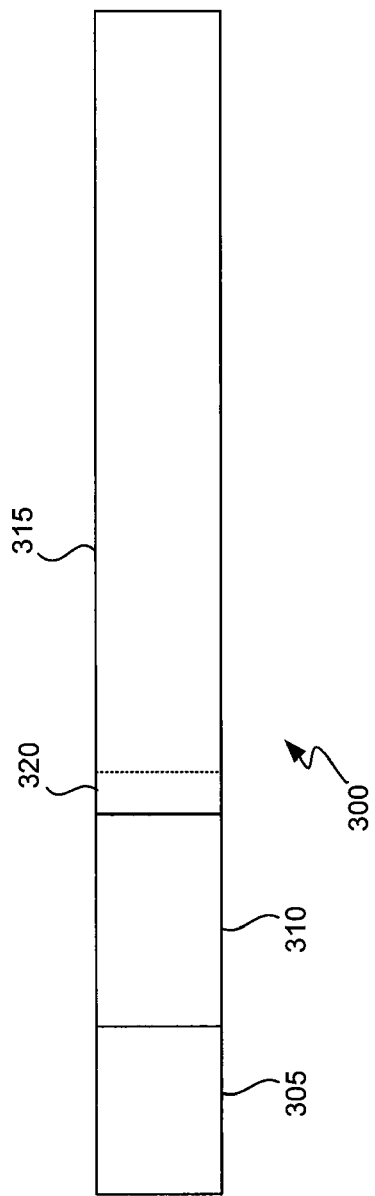
FIG. 3 illustrates a simplified frame having an EISL header.

FIG. 3 illustrates a simplified version of an EISL frame. Here, frame 300 includes EISL header 305, header 310 and payload 315. Header 310 may be, for example, an FC header or an Ethernet header. According to some aspects of the present invention, field 320 is a field of payload 315. In one example, field 320 is a service access point ("SAP") field, which is a part of a fiber channel frame that is reserved for services that may be defined by a client. Field 320, according to some aspects of the invention, is an SAP field used for encoding EPP. According to some such aspects of the invention, field 320 is an EPP header and payload 315 includes an EPP payload, which will be described in more detail below.

Figure 4:
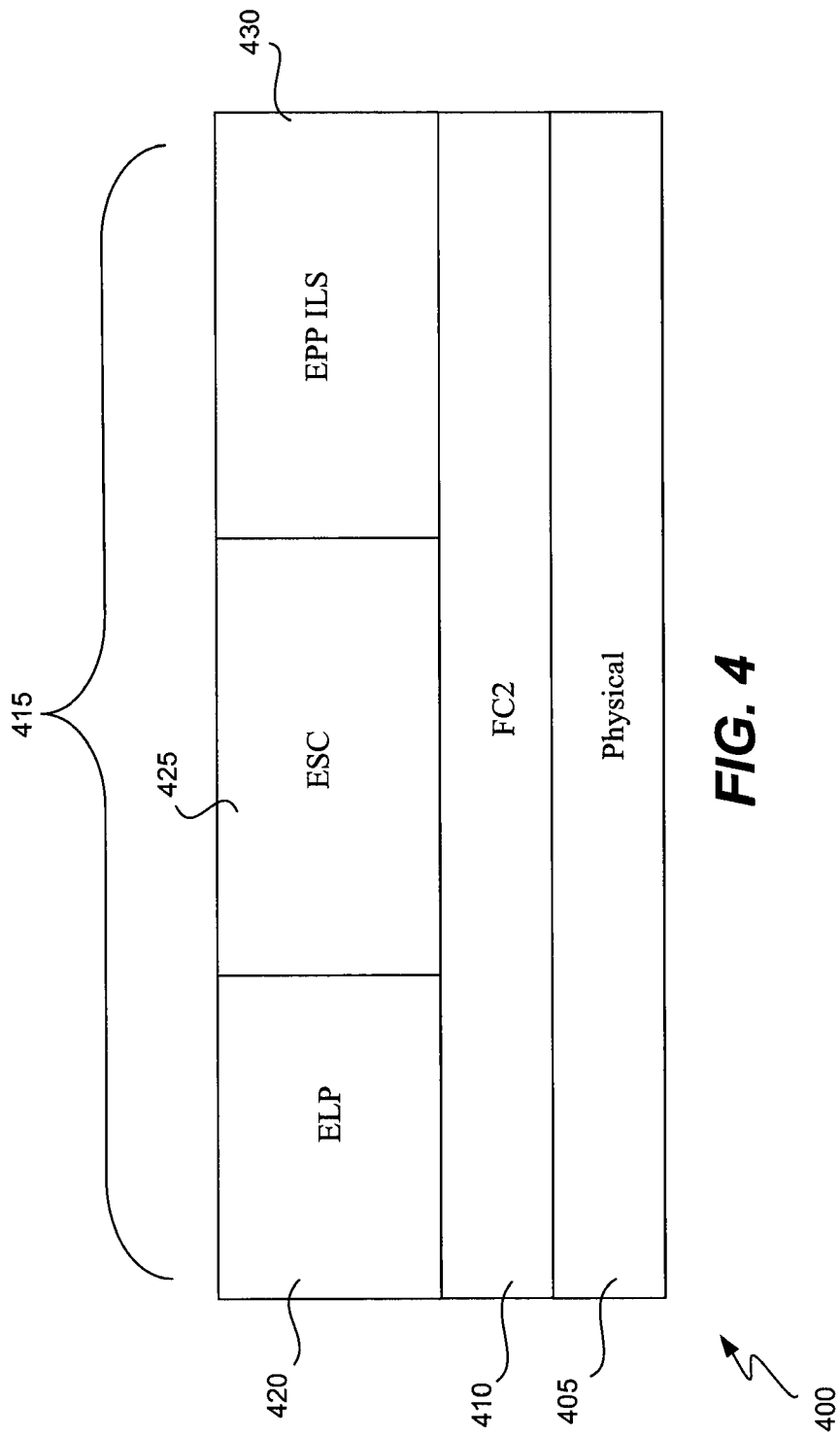
FIG. 4 illustrates an exemplary stack for implementing an exchange peer protocol ("EPP").

FIG. 4 illustrates stack 400 according to some embodiments of the present invention. Stack 400 includes physical layer 405. For simplicity, all of the fiber channel layers are illustrated as a single layer, FC 2 layer 410. Switch Interlink Services ("SW_ILS") layer 415 provides functionality for ELP 420 and ESC 425, according to the standard FC format. Layer 415 also provides a mechanism for vendors to add their own protocols, such as EPP_ILS 430 in this example. The EPP protocol frames exchanged according to SW_ILS service specification are called EPP_ILS frames.

However, not all ports will recognize SW_ILS. Accordingly, in other implementations of the present invention, other formats or services may be used to provide EPP services. For example, other implementations of the invention use Extended Link Services (ELS) format to provide EPP services.

Figure 5:
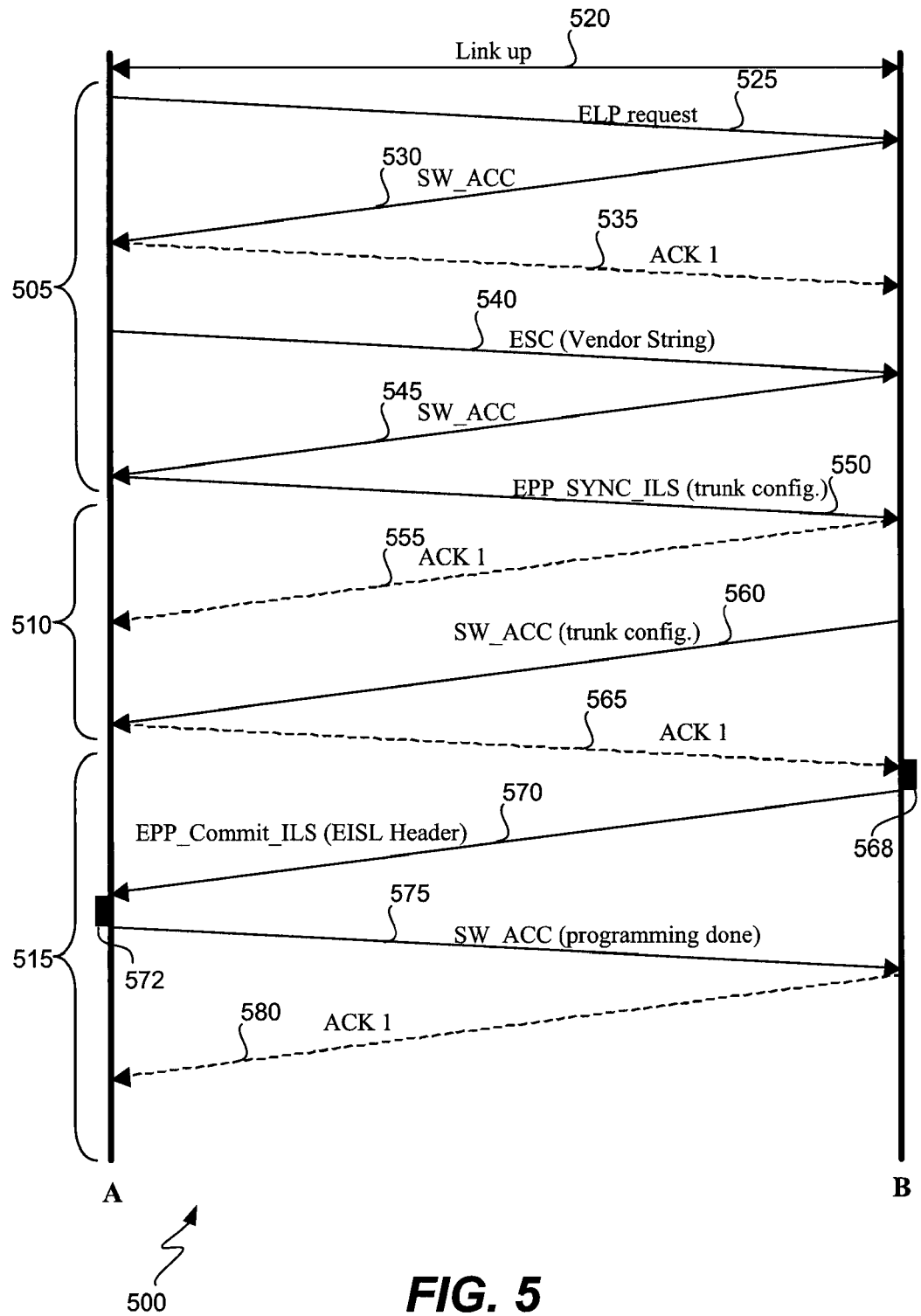
FIG. 5 is a flow diagram that outlines the processes of determining that a device can be configured for EPP and implementing EPP.

FIG. 5 is a flow diagram that depicts an exchange of information between two E ports according to some aspects of the present invention. E port A may be, for example, port 160 of FIG. 1 and E port B may be, for example, E port 170 of FIG. 1. In other embodiments, one or both ports are F ports and may exchange frames using, for example, ELS format.

The information exchanged in section 505 of FIG. 5 represents the detection phase of EPP, wherein the EPP capability of an attached peer port is detected. Detection phase 505 is performed using ELP and ESC according to one implementation of this method.

Area 510 represents the SYNC phase of EPP, wherein configuration information of interest to the peer port is exchanged. According to some such embodiments, the configuration information is exchanged in time-length-value ("TLV") format, which will be described below with reference to FIG. 5A.

Finally, area 515 represents the commit phase of EPP. In the commit phase, the results of the exchange of configuration information that took place during the SYNC phase are applied to hardware and/or software of the peer ports, as needed. In the implementation illustrated in FIG. 5, the EPP detection phase 505 uses ESC service exchanges during E-port initialization. In ESC, the originator port can publish the protocol/services supported by the originator port. The peer port is required to respond with the service it agrees to work with or it can respond as "command unsupported."

At time 520, a link has been established between port A and port B. In step 525, port A sends an ELP request to port B. In this instance, port A has initiated the process. However, as will be explained in more detail below, the present invention includes a mechanism for dealing with situations in which both ports A and B have simultaneously initiated the process. ELP request 525 includes link-level parameters such as buffer-to-buffer credit (indicating how much data can be transmitted from one buffer to another before new credits are required).

In step 530, port B sends information to port A indicating an acceptance of the ELP request. In essence, step 525 involves the sending of port A's link-level parameters to port B and step 530 involves the sending of port B's link-level parameters to port A. In step 535, port A sends an acknowledgement to port B. At this time, port A knows port B's link configuration and port B knows port A's link configuration.

Then, in step 540, port A sends other information regarding the configuration of the network device that includes port A. In this step, port A indicates the services/protocols that port A can support. In some embodiments, the information will include a vendor string that indicates the particular vendor and model number of the network device and its capabilities. In one such embodiment, step 540 includes the transmission of services/protocols that port A can support in code/service pairs. Some codes may be standard FC codes which correspond with standard FC services (e.g., FSPF). However, one such code is a unique code that corresponds with EPP.

In step 545, port B sends an acceptance to port A and also sends information regarding the vendor and switch capabilities of the switch associated with port B. In this example, both port A and port B support EPP. Accordingly, detection phase 505 was successful and in steps 530 and 545, port B accepted port A's request and ESC information, respectively. However, port B could have rejected either of those requests. Alternatively, port B could have selected a different service if port B did not support EPP.

The combination of a request and an acceptance (or of a request and a rejection) will sometimes be referred to herein as an "exchange." In the embodiment described with respect to FIG. 5, the exchanges are performed according to an SW_ILS format, as described above.

After determining that port B supports EPP and that port B could be configured to be a trunking port, port A sends an EPP_SYNC_ILS to port B in step 550 and EPP SYNC_ILS phase 510 begins. In this embodiment, the EPP_SYNC_ILS includes configuration information for use by Port B in configuring itself to be a trunking E port. However, in other embodiments, EPP may be used for port VSAN consistency checks without configuring port B as a trunking port.

Figure 5A:
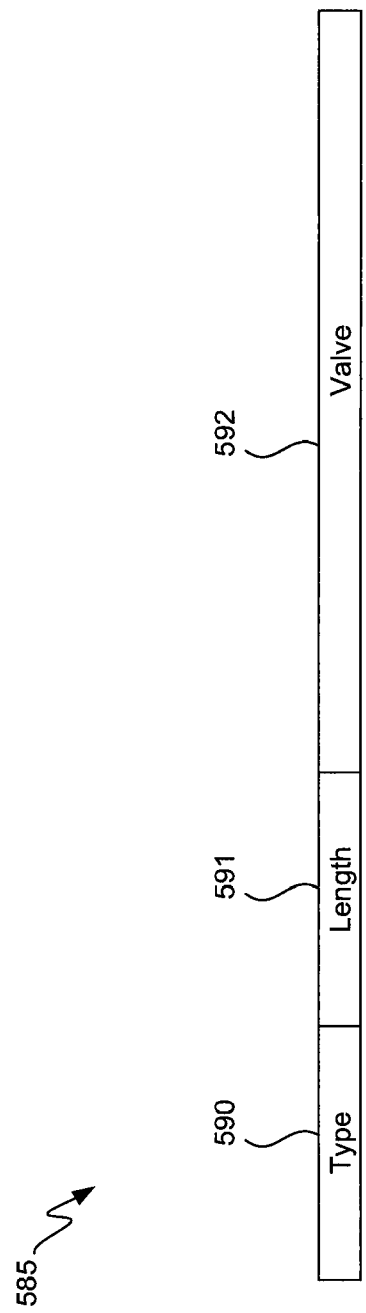
FIG. 5A is a diagram of a time-length-value frame.

FIG. 5A illustrates frame 585 in type-length-value ("TLV") format, which is a preferred format for data exchanged between ports A and B during SYNC phase 510. Type field 590 encodes how value field 592 is to be interpreted. In other words, type field 590 indicates what kind of value will be encoded in value field 592. Length field 591 indicates the length of value field 592, e.g., in bytes. Value field 592 is a payload that encodes information to be interpreted as specified by type field 590.

TLV format is inherently quite flexible, because both the type and length of value field 592 can be varied. However, in other embodiments of the invention, fixed-length frames may be used for the same purpose.

Referring again to FIG. 5, the exchange of trunking information will be described. As noted above, trunking information is one type of information that may be exchanged during step 550 of SYNC phase 510. According to some embodiments of the present invention, trunking configuration information includes admin trunk mode information (administratively configured by the user), which may be "ON," "OFF" or "AUTO." "OFF" indicates that the sending port is configured not to operate as a trunking port. "ON" indicates that the sending port can operate as a trunking port if the receiving port does not explicitly prohibit this from happening. "AUTO" indicates that the sending port can operate as a trunking port if the receiving port is configured with trunking mode "ON."

FIG. 6 is table that indicates trunk mode negotiation according to some aspects of the present invention. If the sending trunk mode (here, port A) has an admin trunk mode setting of "OFF," then the sending port will be treated as a non-trunking port. If the admin trunk mode of the sending port is "ON," the sending port will be treated as a trunking port if the receiving port (here, port B) has an admin trunk mode of "ON" or "AUTO." If the sending port has an admin trunk mode of "AUTO," the receiving port must have an admin trunk mode of ON for the sending trunk mode to operate as a trunking port. Otherwise, the receiving port will operate as a normal port.

Referring again to FIG. 5, in step 555 port B sends an acknowledgement to port A. In step 560, port B sends its own configuration information, which may include trunking configuration information as described above, to port A.

Figure 7:
FIG. 7 is a diagram that indicates VSAN bit map information from port A and port B and the resulting VSAN intersection bit map.

In addition to exchanging admin trunk mode information, ports A and B may exchange VSAN list information during SYNC phase 510. The exchange of VSAN list information according to one such implementation will now be explained with reference to FIG. 7. In this example, ports A and B exchange bit maps that indicate which VSANs to allow. Here, port A sends bit map 705 to port B in which bits 1 through 5 have a value of "1," indicating that VSANs 1 through 5 should be allowed. Port B, in turn, sends bit map 710 indicating that VSANs 4 through 8 should be allowed. In preferred implementations, the bit maps indicate the status of more (or less) than 8 VSANs and include a correspondingly greater (or smaller) number of bits.

Both ports A and B, or the network devices associated with the respective ports, then compute an intersection bit map that indicates the VSANs common to both ports. In this case, intersection bit map 715 indicates that VSANs 4 and 5 are both allowed. In some embodiments of the present invention, the intersection bit map is computed at the end of the EPP_SYNC phase. In other embodiments of the present invention, the intersection bit map is computed at other times. However, this process should occur prior to the beginning of the commit phase.

After the intersection bit map has been computed, the network devices associated with ports A and B each will store the intersection bit map in memory and only VSANs 4 and 5 will be permitted to send data frames along this data path. VSANs 4 and 5 are known as "operational VSANs" on the link between port A and port B.

According to some embodiments of the present invention, the configuration information exchanged during SYNC phase 510 includes port VSAN information. In some such aspects of the invention, port VSAN information is particularly important when the ports are functioning as non-trunking ports. If ports are functioning as trunking ports, the EISL header will contain a VSAN number indicating the VSAN to which the frame belongs.

However, according to some aspects of the invention, if the ports are not functioning as trunking ports, there will be no EISL header and consequently no VSAN number. If a port is not trunking, frames will be transmitted in the native FC format, not in EISL format. However, a VSAN will be implicitly associated with each frame. This VSAN is the port VSAN of the receiving port.

By default, every E port has a port VSAN number equal to 1. However, various port VSAN numbers may be assigned. If there is a mismatch between port VSAN numbers, various actions may take place according to various aspects of the present invention. According to some such aspects, a system administrator would be notified if, for example, a port having a port VSAN number of 1 sent a packet to a port having a port VSAN number of 2. According to other aspects of the invention, one or more of the ports would be brought down in the event of such a port VSAN mismatch.

At the end of step 560, port A knows the configuration of port B and port B knows the configuration of port A. In step 565, port A sends an acknowledgement to port B indicating that it has received port B's EPP_SYNC configuration information. Then, the EPP_SYNC phase of the process has concluded. On completion of SYNC phase 510, ports A and B will evaluate the configuration information that needs to be applied.

In the current example, ports A and B are configured to become trunking E ports. Accordingly, prior to EPP_Commit phase 515, port B is configured to be a trunking E port in programming step 568. According to some aspects of the invention, programming step 568 involves hardware programming necessary for supporting trunking mode operation and the preparation of EISL frames. In one instance, when the port is enabled for trunking mode, all frames are transmitted in EISL format.

When step 568 is complete, the EPP_Commit phase commences in step 570 by the sending of an EPP_Commit request from port B to port A. After port A receives the EPP_Commit request, port A performs its own programming operation in step 572, which is parallel to the programming step 568 of port B: according to some aspects of the invention, programming step 572 involves hardware programming necessary for supporting trunking mode operation and the preparation of EISL frames. In one instance, when the port is enabled for trunking mode, all frames are transmitted in EISL format. Then, in step 575, port A sends an SW_ACC to port B, indicating that port A has completed its programming step.

Then, in step 580, port B sends an acknowledgement to port A indicating receipt of the SW_ACC sent in step 575 and completion of the EPP commit exchange on its side. At this time, port A has completed the EPP commit exchange. In the present example, this means that ports A and B are now configured for trunk mode operation At some time after ports A and B have been transmitting data, an operator may decide to reconfigure some aspect of the ports. For example, the VSAN number may change on one or both of the ports and a new intersection bit map would need to be computed. If this is the case, the foregoing process need not go back through the ELP and ESC phases, but may proceed directly to the EPP_SYNC and EPP_Commit phases.

Figure 7A:
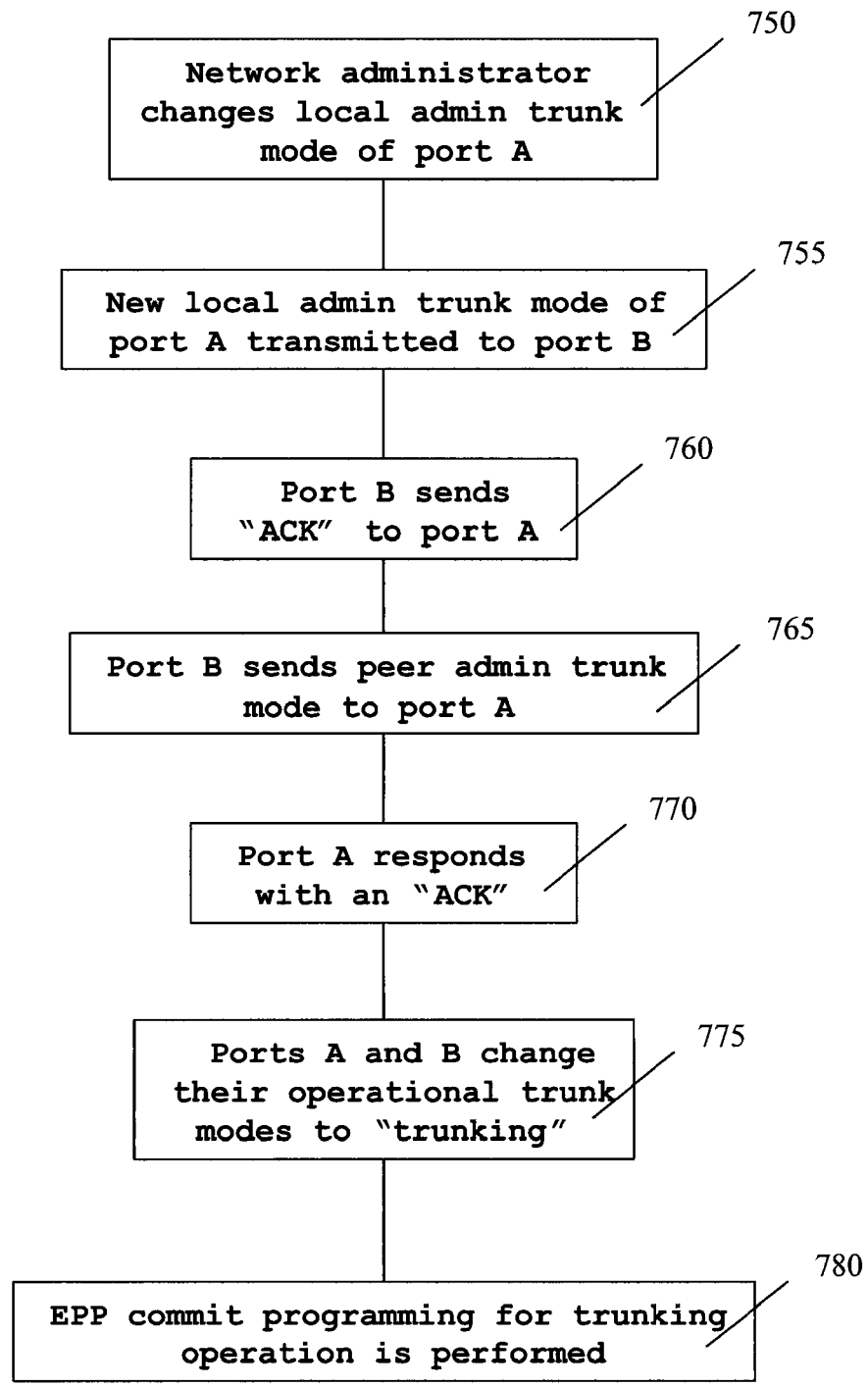
FIG. 7A is a flow chart that outlines a process for implementing the EPP SYNC and commit phases after a link has previously been established.

This process will be outlined with reference to FIG. 7A. In step 750, a network administrator changes the local admin trunk mode of port A from "AUTO" to "ON." In step 755, the EPP SYNC process begins with a parallel to step 550 of FIG. 5, in which the new local admin trunk mode of port A is transmitted to port B. In step 760, port B sends an "ACK" to port A. In this example, the peer admin trunk mode (of port B) remains set to "AUTO." Consequently, port B sends its peer admin trunk mode to port A in step 765, port A responds with an "ACK" in step 770 and both ports change their operational trunk mode to T (trunking) in step 775. The necessary EPP commit programming for trunking operation is performed in step 780.

Figure 8:
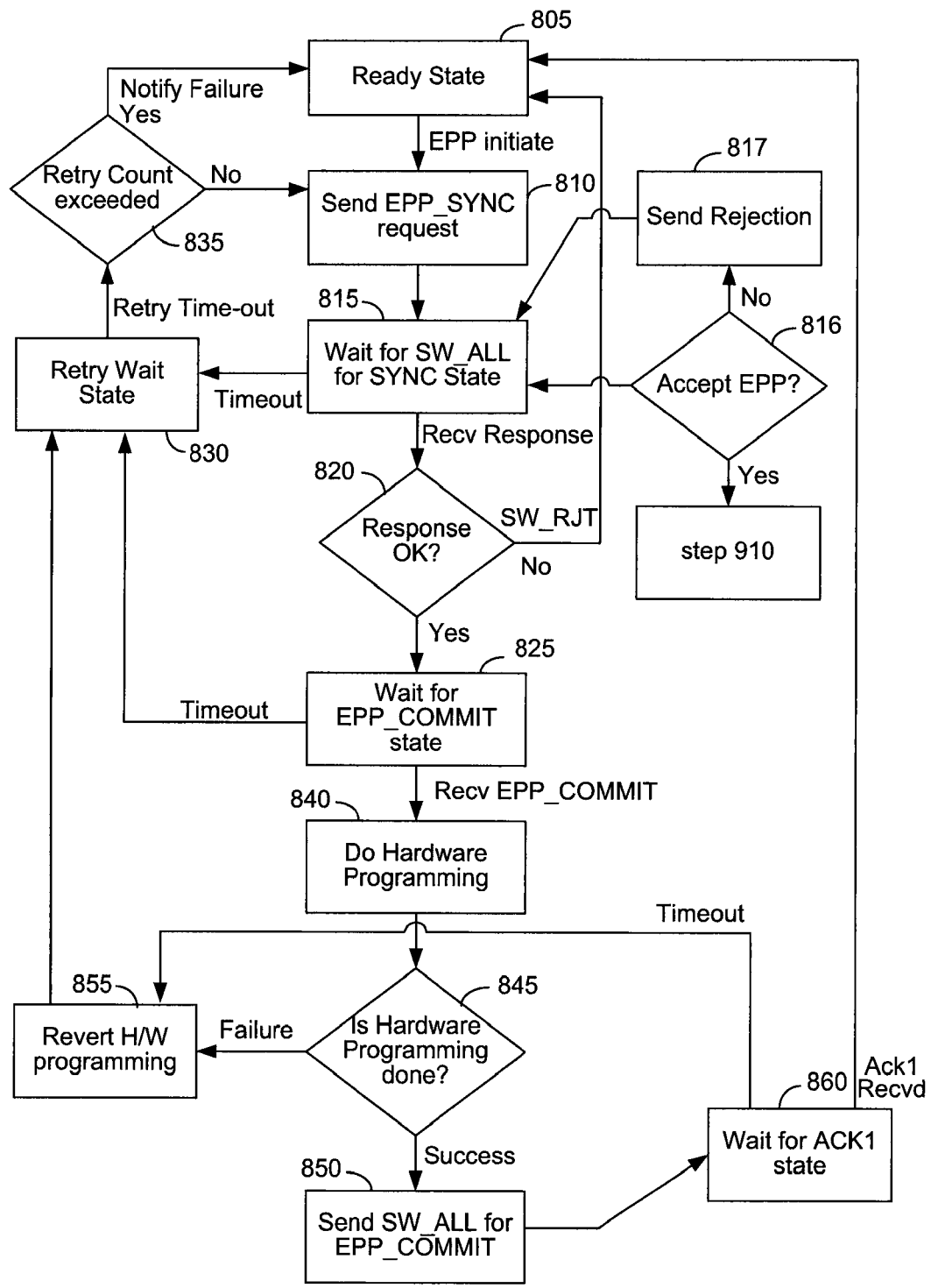
FIG. 8 is a flow chart that outlines the EPP process for an initiating port.

FIG. 8 is a flow chart that depicts the process flow of an EPP method from the initiating port's perspective, according to one aspect of the present invention. The first step is step 805, the ready state. In step 810, an EPP_SYNC request is sent to the receiving port. In step 815, the initiating port requests an acceptance from the receiving port for the EPP_SYNC request. If the response is received within a predetermined time, the response is evaluated in step 820. If the response is not received within the predetermined time, the method proceeds to step 830 and the initiating port enters a retry waiting state.

Sometimes port B will send its own EPP_SYNC request during the time port A is awaiting a response to port A's EPP_SYNC request. This circumstance is known as a "collision." In the event of a collision, in step 816 port A determines whether to accept the EPP_SYNC request from port B. If port A does accept the EPP_SYNC request from port B, the process continues to step 910 of FIG. 9, which is described below. If port A does not accept the EPP_SYNC request from port B, port A sends a rejection (e.g., an "SW_RJT") to port B in step 817. Then, the process returns to step 815.

In step 835, it is determined whether the retry count or time is exceeded. If this retry count is exceeded, a failure will be reported and the system will return to a ready state. If the retry count is not exceeded, the EPP_SYNC request will be sent once again in step 810 and the process will proceed from step 810.

In step 820, if the response is determined to be acceptable, the method proceeds to step 825, where the system waits for an EPP_Commit state. If the response is determined not to be acceptable in step 820, an SW_RJT response is sent to the receiving port and the initiating port returns to the ready state of step 805.

If an EPP_Commit is received by the initiating port in step 825, then the process continues to step 840, wherein hardware programming is performed on the initiating port. In step 845, it is determined whether the hardware programming is completed. If not, the method proceeds to step 855, wherein the hardware programming step is reported and the system enters the retry condition of step 830. If the hardware programming is a success, the method proceeds to step 850 and an SW_ACC response for the EPP_Commit is transmitted to the receiving port.

The process then continues to step 860, wherein the initiating port waits for an acknowledgement from the receiving port. If the acknowledgement is not received within a predetermined time, then the process proceeds to step 855. If the acknowledgement is received within the predetermined time, the initiating port returns to the steady state of step 805.

Figure 9:
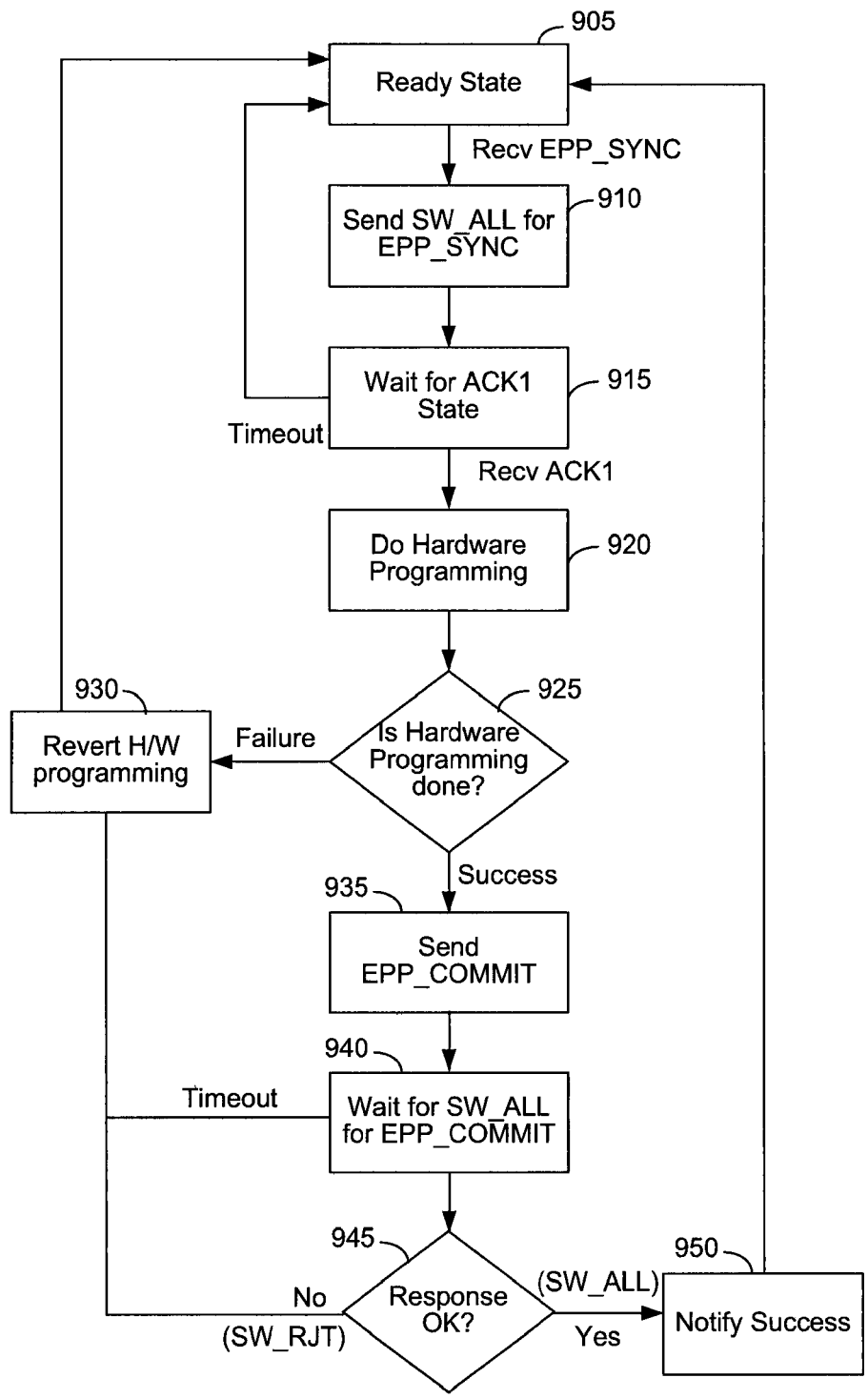
FIG. 9 is a flow chart that outlines the EPP process for a receiving port.

FIG. 9 indicates the EPP process from the perspective of the receiving port. In step 905, the receiving port is in a ready state. In step 910, an SW_ACC is sent to the initiating port for the EPP_SYNC. In step 915, the receiving port waits for an acknowledgement for the SW_ACC response. If this response is not received within a predetermined time, there is a timeout and the receiving port returns to the ready state of step 905. If the acknowledgement is received within the predetermined, the method proceeds to step 920 and hardware programming is performed on the receiving port. In 925 it is determined whether the hardware programming is completed. If not, a failure report is made in step 930 and the receiving port returns to a ready state in step 905. If the hardware programming is done, the method proceeds to step 935 and an EPP_Commit is sent to the initiating port.

In step 940, the receiving port waits for an SW_ACC for the EPP_Commit that it has sent to the initiating port. If no such response is received within a predetermined time, the process proceeds to step 930 and a failure is reported. The receiving port then returns to the ready state of step 905. If a response is received during the predetermined time, then the method proceeds to step 945 and the response is evaluated. If the response is determined to be acceptable, a success is notified. In step 950, if the response is not determined to be acceptable, an error is reported and the system returns to the ready state of 905.

FIG. 10 indicates the components, values and sizes of EPP header fields according to some embodiments of the present invention. Other embodiments may have more or fewer fields. Moreover, the fields may have lengths other than those depicted in FIG. 10.

In one implementation of the present invention that uses SW_ILS, the command identifier field indicates values chosen from a range of vendor specific command identifiers. The command identifier may indicate, for example, an EPP request, an SW_RJT (reject) or an SW_ACC (accept). In one embodiment, the value of the command ID is 0X71000000. The revision field identifies the revision of the EPP service. For the first revision, the value is 1. The revision number should be changed every time there is a change in the EPP header.

As noted above, in some implementations EPP uses a two-phase mechanism to establish the operating environment. The first phase is the synchronizing phase (EPP_SYNC), where the configuration information on both sides is synchronized. The second phase is the commit phase (EPP_COMMIT), where the actual hardware programming is performed. The EPP command code field is used to identify whether the EPP request sequence is from the EPP_SYNC phase or the EPP_COMMIT phase.

The session field is used to identify a particular session on the side that initiated the EPP request sequence. In some cases of error or failure, EPP will retry its protocol exchange. The session number will be changed for each retry of the EPP operation. This feature helps identify stale sessions.

The worldwide name (WWN) indicates the WWN of the network device to which the port belongs. According to some aspects of the present invention, the WWN information is used for resolving "collisions" of simultaneous EPP_SYNC requests.

The payload length field is used to identify the total length of the payload, including the EPP header. The reserved field is reserved for future use.

There will be times when 2 ports will simultaneously send EPP requests to one another. Such "collisions" will be resolved based on the WWN of the network device with which the port is associated. The port within the network device having the lower WWN will send an SW_ACC to the other port. The port whose network device has the WWN will send SW_RJT to the other port, with a reason code indicating collision.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches.

For example, the methods of this invention may be implemented in specially configured network devices such as the MDS 9000 family of switches manufactured by Cisco Systems, Inc. of San Jose, Calif. A generalized architecture for some such machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 11:
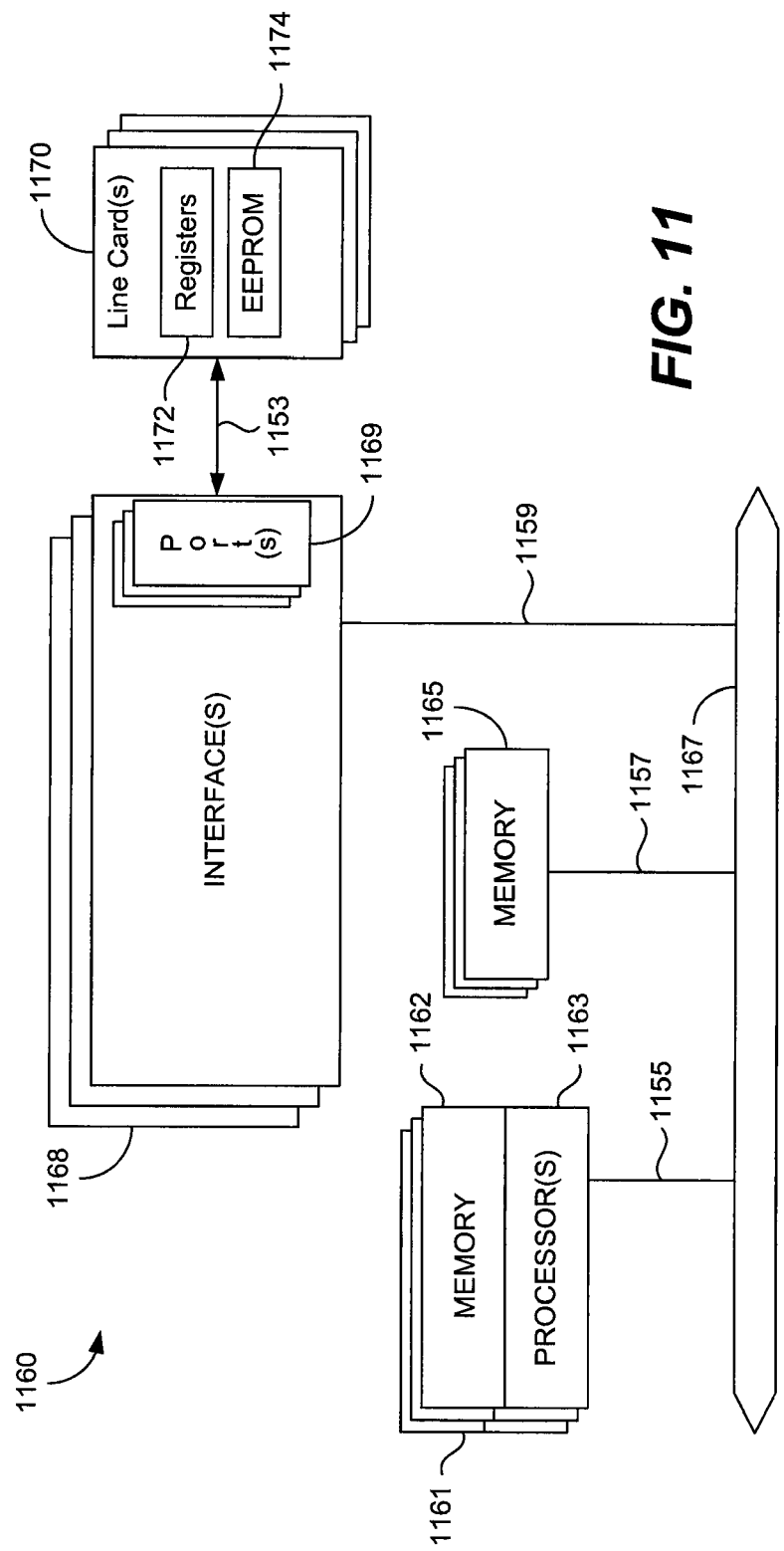
FIG. 11 depicts a network device that may be configured to perform the methods of the present invention.

Referring now to FIG. 11, a network device 1160 suitable for implementing the techniques of the present invention includes a master central processing unit (CPU) 1162, interfaces 1168, and a bus 1167 (e.g., a PCI bus). When acting under the control of appropriate software or firmware, the CPU 1162 may be responsible for implementing specific functions associated with the functions of a desired network device. For example, when configured as an intermediate router, the CPU 1162 may be responsible for analyzing packets, encapsulating packets, and forwarding packets for transmission to a set-top box. The CPU 1162 preferably accomplishes all these functions under the control of software including an operating system (e.g. Windows NT), and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

The interfaces 1168 are typically provided as interface cards (sometimes referred to as "line cards"). Generally, they control the sending and receiving of data packets over the network and sometimes support other peripherals used with the network device 1160. Among the interfaces that may be provided are Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of the network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For instance, it will be appreciated that at least a portion of the functions described herein that are performed by a network device such as a router, a switch and/or selected components thereof, may be implemented in another device. For example, these functions can be performed by a host device (e.g., a personal computer or workstation). Such a host can be operated, for example, by a network administrator. Considering these and other variations, the scope of the invention should be determined with reference to the appended claims.

We claim:

1. A method, comprising:
   determining, by a first port of a first network device, that a second port of a second network device supports a protocol to be used to exchange configuration information, wherein the protocol is supported by the first port;
   exchanging configuration information by the first port of the first network device with the second port using the protocol after determining, by the first port of the first network device, that the second port supports the protocol; and
   automatically configuring the first port according to the exchanged configuration information;
   wherein automatically configuring the first port according to the exchanged configuration information comprises automatically configuring the first port to support virtual storage area network (VSANs) that are supported by both the first port and the second port.

2. The method of claim 1, wherein the determining step comprises exchanging information with the second port via Exchange Link Parameter protocol or via Exchange Switch Capability protocol.

3. The method of claim 1, wherein the exchanging step comprises exchanging frames with the second port in type-length-value format or in a fixed frame length format.

4. The method of claim 1, wherein the configuration information comprises trunk mode information.

5. The method of claim 1, further comprising causing the second port to be configured according to the exchanged information.

6. A method, comprising:
   determining, by a first port of a first network device, that a second port of a second network device supports Exchange Peer Parameters protocol;
   exchanging configuration information with the second port using Exchange Peer Parameters protocol; and
   automatically configuring the first port according to the exchanged information;
   wherein the configuring step comprises configuring the first port to enable transmission of frames to the second port in Extended Interswitch Link format.

7. An apparatus, comprising:
   means for determining by a second port of a second network device that a first port of a first network device supports a protocol to be used to exchange configuration information, wherein the protocol is supported by the second port of the second network device;
   means for exchanging configuration information by the second port with the first port using the protocol after determining by the second port of the second network device that the first port of the first network device supports the protocol; and
   means for configuring a second port of the second network device according to the exchanged configuration information;
   wherein configuring the second port of the second network device according to the exchanged configuration information comprises configuring the second port to support VSANs that are supported by both the first port and the second port.

8. An apparatus, comprising:
   a first port;
   a memory; and
   a processor, at least one of the memory or the processor being configured to do the following:
   determine, by the first port, that a second port of a second network device supports a protocol to be used to exchange configuration information, wherein the protocol is supported by the first port;
   exchange configuration information by the first port with the second port using the protocol after determining, by the first port, that the second port supports the protocol; and
   configure the first port according to the exchanged configuration information, wherein the first port is configured to support VSANs that are supported by both the first port and the second port.

9. The apparatus of claim 8, wherein the processor is configured to exchange information, via the first port, with the second port using Exchange Link Parameter protocol or using Exchange Switch Capability protocol.

10. The apparatus of claim 8, wherein the processor is configured to exchange frames, via the first port, with the second port in type-length-value format or in a fixed frame length format.

11. The apparatus of claim 8, wherein the configuration information comprises virtual storage area network information or trunk mode information.

12. The apparatus of claim 8, wherein the processor is further configured to cause the second port to be configured according to the exchanged information.

13. An apparatus, comprising:
a first port;
a memory; and
a processor, at least one of the memory or the processor being configured to do the following:
 determine, via information exchanged via the first port, that a second port supports Exchange Peer Parameters protocol;
 exchange, via the first port, configuration information with the second port using Exchange Peer Parameters protocol; and
 automatically configure the first port according to the exchanged information;
wherein the processor is configured to enable the first port to transmit frames to the second port in Extended Interswitch Link format.

14. A line card comprising the apparatus of claim 8.

15. A network device comprising the apparatus of claim 8.

16. A method, comprising:
determining, by a first port of a first network device, whether a second port of a second network device supports Exchange Peer Parameters protocol, wherein the first port of the first network device supports the Exchange Peer Parameters protocol; and
if the first port of the first network device determines that the second port of the second network device supports the Exchange Peer Parameters protocol, exchanging configuration information with the second port using the Exchange Peer Parameters protocol and automatically configuring the first port according to the exchanged information;
wherein the configuring step comprises configuring the first port to enable transmission of frames to the second port in Extended Interswitch Link format.

17. The method of claim 1, wherein the protocol is the Exchange Peer Parameters protocol.

18. The method of claim 1, wherein the configuration information comprises virtual storage area network information, wherein exchanging configuration information by the first network device with the second port using the protocol after determining that the second port supports the protocol comprises:
 receiving configuration information from the second port, wherein the configuration information comprises virtual storage area network information indicating one or more virtual storage area networks (VSANs) that are supported by the second port.

19. The method as recited in claim 18, wherein exchanging configuration information by the first network device with the second port using the protocol after determining that the second port supports the protocol further comprises:
 sending configuration information to the second port, wherein the configuration information comprises virtual storage area network information indicating one or more VSANs that are supported by the first port.

20. An apparatus, comprising:
a first port;
a memory; and
a processor, at least one of the memory or the processor being configured to do the following:
 determining, by the first port, that a second port of a second network device supports a protocol to be used to exchange configuration information, wherein the protocol is supported by the first port;
 exchanging configuration information by the first port with the second port using the protocol after determining, by the first port, that the second port supports the protocol; and
 automatically configuring the first port according to the exchanged configuration information;
wherein only VSANs that are supported by both the first port and the second port are permitted to send frames on a link between the first port and the second port.

21. The method as recited in claim 1, wherein exchanging configuration information by the first network device with the second port using the protocol after determining that the second port supports the protocol comprises receiving configuration information from the second port and wherein automatically configuring the first port according to the exchanged configuration information comprises automatically configuring the first port according to the received configuration information.

22. The method as recited in claim 21, wherein exchanging configuration information by the first network device with the second port using the protocol after determining that the second port supports the protocol further comprises sending configuration information associated with the first port to the second port, thereby enabling the second port to be automatically configured according to the configuration information that has been sent to the second port.

23. The method as recited in claim 1, wherein the first network device is a first switch and the second network device is a second switch.

24. A method comprising:
exchanging configuration information by a first port of a first network device with a second port of a second network device, wherein exchanging configuration information includes:
 sending first configuration information to the second port, wherein the first configuration information comprises virtual storage area network information indicating one or more VSANs that are supported by the first port, and
 receiving second configuration information from the second port, wherein the second configuration information comprises virtual storage area network information indicating one or more virtual storage area networks (VSANs) that are supported by the second port;
identifying one or more VSANs that are supported by both the first port and the second port by comparing the VSANs supported by the first port with the VSANs supported by the second port; and
automatically configuring the first port according to the exchanged configuration information by automatically configuring the first port to support the VSANs that are supported by both the first port and the second port.

* * * * *